(12) United States Patent
Arakawa et al.

(10) Patent No.: US 12,239,933 B2
(45) Date of Patent: Mar. 4, 2025

(54) CORRECTING SYSTEM, AND CORRECTING METHOD

(71) Applicant: DAIKIN INDUSTRIES, LTD., Osaka (JP)

(72) Inventors: Takeshi Arakawa, Osaka (JP); Yuta Sasai, Osaka (JP); Toshio Tanaka, Osaka (JP); Kiyoshi Kuroi, Osaka (JP); Satoshi Hara, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/126,191

(22) Filed: Mar. 24, 2023

(65) Prior Publication Data

US 2023/0233977 A1 Jul. 27, 2023

Related U.S. Application Data

(63) Continuation of application No. PCT/JP2021/035978, filed on Sep. 29, 2021.

(30) Foreign Application Priority Data

Sep. 29, 2020 (JP) ................ 2020-163743

(51) Int. Cl.
*B01D 46/46* (2006.01)
*B01D 46/00* (2022.01)
*G01N 15/08* (2006.01)

(52) U.S. Cl.
CPC ......... *B01D 46/46* (2013.01); *B01D 46/0041* (2013.01); *B01D 46/0086* (2013.01); *G01N 15/08* (2013.01); *G01N 2015/084* (2013.01)

(58) Field of Classification Search
None
See application file for complete search history.

(56) References Cited

U.S. PATENT DOCUMENTS 7,922,914 B1 *  4/2011  Verdegan ............. B01D 37/046
                                                    702/50
9,005,445 B2 *  4/2015  Hamasaki ............. B01D 65/10
                                                    516/97

(Continued)

FOREIGN PATENT DOCUMENTS

CA      2680314 A1 *  9/2008  ............. B01D 65/10
CN    110462177 A  * 11/2019  ......... B01D 46/0086

(Continued)

OTHER PUBLICATIONS

Global Spec, "HEPA Filters and ULPA Filters Information", Nov. 12, 2019, all pages. https://web.archive.org/web/20191112093228/https://www.globalspec.com/learnmore/manufacturing_process_equipment/filtration_separation_products/hepa_filters_ulpa_filters (Year: 2019).*

(Continued)

*Primary Examiner* — Brit E. Anbacht
(74) *Attorney, Agent, or Firm* — GLOBAL IP COUNSELORS, LLP

(57) ABSTRACT

A correcting system includes an acquisition unit, a storage unit, and a correction unit. The acquisition unit acquires information indicating first capture efficiency of a filter for first microscopic particles. The storage unit stores correction data to correct the first capture efficiency to second capture efficiency of the filter for second microscopic particles. The correction unit corrects the first capture efficiency acquired by the acquisition unit to the second capture efficiency based on the correction data.

10 Claims, 8 Drawing Sheets

(56) References Cited

U.S. PATENT DOCUMENTS

| | | | |
|---|---|---|---|
| 10,002,901 B1* | 6/2018 | Xu | H04N 25/76 |
| 2006/0235085 A1* | 10/2006 | Hongo | A61K 33/243 |
| | | | 516/77 |
| 2014/0331622 A1* | 11/2014 | Gruenbacher | B01D 46/42 |
| | | | 55/467 |
| 2015/0275738 A1 | 10/2015 | Van Nieuwstadt et al. | |
| 2020/0123958 A1* | 4/2020 | Schwarzmann | F01N 11/005 |

FOREIGN PATENT DOCUMENTS

| | | | | |
|---|---|---|---|---|
| CN | 107998760 B | | 6/2020 | |
| CN | 111551478 A | | 8/2020 | |
| DE | 102017205361 A1 | * | 10/2018 | B01D 46/0086 |
| JP | 2008-213711 A | | 9/2008 | |
| JP | 2014085218 A | * | 5/2014 | |
| JP | 7007624 B1 | * | 1/2022 | |
| WO | WO-2016052734 A1 | * | 4/2016 | F01N 11/007 |
| WO | WO-2018142072 A1 | * | 8/2018 | B01D 46/0086 |

OTHER PUBLICATIONS

International Search Report of corresponding PCT Application No. PCT/JP2021/035978 dated Dec. 14, 2021.
International Preliminary Report of corresponding PCT Application No. PCT/JP2021/035978 dated Apr. 13, 2023.
European Search Report of corresponding EP Application No. 21 87 5735.9 dated Jan. 30, 2024.

* cited by examiner

FIRST MICROSCOPIC PARTICLES
(AIRBORNE DUST PARTICLES)

SECOND MICROSCOPIC PARTICLES (KCl)

| TYPE OF DUST PARTICLES | FIRST MICROSCOPIC PARTICLES (AIRBORNE DUST PARTICLES) | SECOND MICROSCOPIC PARTICLES (KCl) |
|---|---|---|
| CAPTURE EFFICIENCY (0.3~1 μm) | 0.61 | 0.79 |

$$\eta_d'' = k_d \times \eta_d' \quad (d = 1,2,3,,n) \qquad X, X31$$

$$\eta' = 1 - \left(\prod_{d=1}^{n}(1-\eta_d'')\right)^{1/n} \quad (d = 1,2,3,,n) \qquad X, X4$$

FIG.14

$$\eta_d''' = k_d \times \eta_d \quad (d = 1,2,3,,n) \qquad X, X32$$

FIG.15

$$\eta' = 1 - \left(\prod_{d=1}^{n}(1 - \eta_d''')\right)^{1/n} \quad (d = 1,2,3,,n) \qquad X, X6$$

CORRECTING SYSTEM, AND CORRECTING METHOD

CROSS-REFERENCE TO RELATED APPLICATIONS

This is a continuation of International Application No. PCT/JP2021/035978 filed on Sep. 29, 2021, which claims priority to Japanese Patent Application No. 2020-163743, filed on Sep. 29, 2020. The entire disclosures of these applications are incorporated by reference herein.

BACKGROUND

Technical Field

The present disclosure relates to a correcting system and a correcting method.

Background Art

An air conditioner of Japanese Unexamined Patent Publication No. 2008-213711 includes a filter, which captures dust particles in air which has been taken into the air conditioner from outside.

SUMMARY

A first aspect of the present disclosure is directed to a correcting system including an acquisition unit, a storage unit, and a correction unit. The acquisition unit is configured to acquire information indicating first capture efficiency of a filter for first microscopic particles. The storage unit is configured to store correction data to correct the first capture efficiency to second capture efficiency of the filter for second microscopic particles. The correction unit is configured to correct the first capture efficiency acquired by the acquisition unit to the second capture efficiency based on the correction data.

BRIEF DESCRIPTION OF THE DRAWINGS

FIG. 14 illustrates second correction information.

FIG. 15 illustrates second relationship information.

DETAILED DESCRIPTION OF EMBODIMENT(S)

Figure 1:
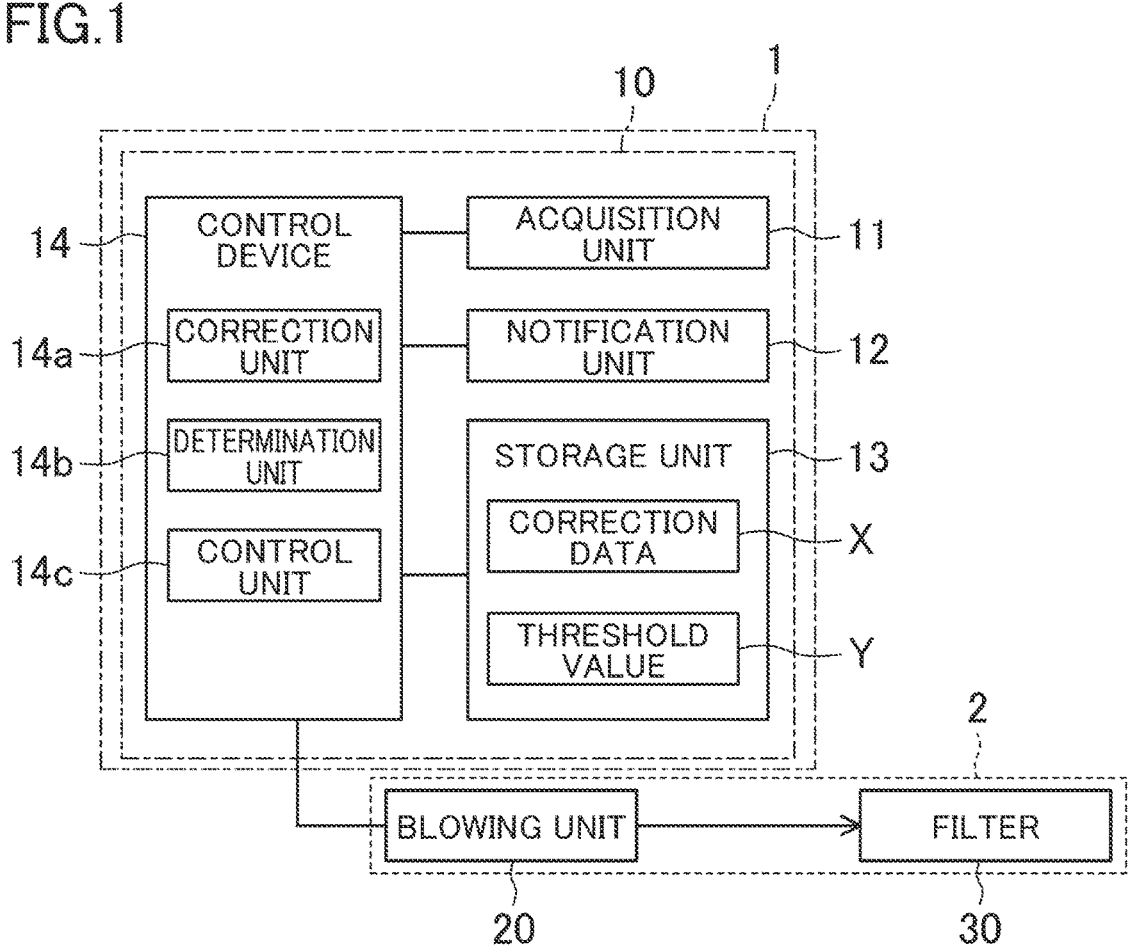
FIG. 1 is a block diagram illustrating a configuration of a correcting system according to a first embodiment of the present invention.

Embodiments of the present invention will be described in detail with reference to the drawings. Note that like reference characters denote the same or equivalent components in the drawings, and the detailed description thereof, the description of advantages associated therewith, and other descriptions will not be repeated.

First Embodiment

A correcting system (1) according to the first embodiment of the present invention will be described with reference to FIGS. 1 and 2. FIG. 1 is a block diagram illustrating a configuration of the correcting system (1) according to the first embodiment of the present invention.

General Configuration

As illustrated in FIG. 1, the correcting system (1) is a system in which a capture efficiency of a filter (30) for first microscopic particles in an actual environment (a place where the filter (30) is installed) is corrected to a capture efficiency of the filter (30) for second microscopic particles defined in a standard in which reference values (reference capture efficiencies) for the use of the filter (30) are set.

Hereinafter, the standard in which reference values for the use of the filter (30) are set may be referred to as a reference standard.

In the first embodiment, the reference standard is the ASHRAE standard 52.2. ASHRAE is an abbreviation for "American Society of Heating, Refrigerating and Air-Conditioning Engineers." In the first embodiment, the reference values in the reference standard are 75% or higher of the capture efficiency according to the rating of MERV14, where an average particle diameter used to evaluate under the ASHRAE standard 52.2 ranges from 0.3 μm to 1.0 μm. The reference standard is not limited to the ASHRAE standard 52.2, and another standard (EN1822 standard or the like) may be used.

The first microscopic particles are microscopic particles (airborne dust particles) in the atmosphere present around the filter (30) installed in the actual environment. The second microscopic particles are microscopic particles used for measuring the capture efficiency of the filter in the reference standard. In the first embodiment, the second microscopic particles are potassium chloride (KCl) microscopic particles used in the ASHRAE standard 52.2.

Hereinafter, the capture efficiency for the first microscopic particles may also be referred to as first capture efficiency, and the capture efficiency for the second microscopic particles may also be referred to as second capture efficiency.

The filter (30) has a function of filtering microscopic particles such as dust particles in the gas. The type of the filter (30) is not limited to particular types. Examples of the filter (30) include a diesel particulate filter and an electrostatic filter.

The correcting system (1) includes a processing device (10). The processing device (10) is, for example, a personal computer (PC). The processing device (10) includes an acquisition unit (11), a notification unit (12), a storage unit (13), and a control device (14).

The acquisition unit (11) acquires information indicating the first capture efficiency of the filter (30) installed in the actual environment.

A first example of the acquisition unit (11) will be described.

In the first example, the acquisition unit (11) acquires information indicating the first capture efficiency on the basis of a measurement result from a fine particle sensor installed in the actual environment. The first example will be described in detail below. In the first example, the acquisition unit (11) is connected to the fine particle sensor in a wired or wireless manner, and acquires, from the fine particle sensor, information indicating a particle size distribution of the first microscopic particles present in the gas upstream of the filter (30) (in other words, the gas before passing through the filter (30)), and information indicating a particle size distribution of the first microscopic particles present in the gas downstream of the filter (30) (in other words, the gas after passing through the filter (30)). The acquisition unit (11) outputs the first capture efficiency based on the particle size distribution acquired (the ratio between the particle size distribution upstream of the filter (30) and the particle size distribution downstream of the filter (30)). In this case, the acquisition unit (11) includes, for example, a communication port or a wireless LAN board for communicably connecting to the fine particle sensor, and a processor for calculating the first capture efficiency based on the particle size distribution acquired from the fine particle sensor.

A second example of the acquisition unit (11) will now be described.

In the second example, the acquisition unit (11) includes an input section (such as a keyboard, a touch panel, and a mouse) configured to receive input of information indicating the first capture efficiency. In this case, for example, an operator uses a measurement instrument such as the fine particle sensor to measure the first capture efficiency of the filter (30) installed in the actual environment, and inputs the measurement result through the acquisition unit (11). As a result, the acquisition unit (11) acquires information indicating the first capture efficiency.

A third example of the acquisition unit (11) will now be described.

The first capture efficiency acquired by the acquisition unit (11) is not limited to one measured in the actual environment, and may be one estimated. In this case, the acquisition unit (11) is a processor. In this case, relationship data in which the relationship between the cumulative usage time of the filter (30) and the first capture efficiency of the filter (30) for the first microscopic particles is recorded is stored in the storage unit (13). The acquisition unit (11) measures the cumulative usage time of the filter (30) and estimates the first capture efficiency corresponding to the measured cumulative usage time of the filter (30) in recorded data as the current first capture efficiency of the filter (30).

The notification unit (12) makes notification of predetermined information. The notification unit (12) includes, for example, a speaker that emits notification sounds, a display that displays predetermined information, and/or a communication device that transmits predetermined information to an external terminal (such as a smartphone). The predetermined information will be described later.

The storage unit (13) includes a main memory (e.g., a semiconductor memory), such as a flash memory, a read only memory (ROM), and a random access memory (RAM), and may further include an auxiliary memory (e.g., a hard disk drive, a solid state drive (SSD), a secure digital (SD) memory card, or a universal serial bus (USB) flash memory). The storage unit (13) stores various computer programs executable by the control device (14). The storage unit (13) stores correction data (X) and a threshold value (Y). The correction data (X) and the threshold value (Y) will be described later.

The control device (14) includes a processor, such as a central processing unit (CPU) and a microprocessor unit (MPU). The control device (14) executes the computer programs stored in the storage unit (13) to control elements of the processing device (10). The control device (14) includes a correction unit (14a), a determination unit (14b), and a control unit (14c). The control device (14) executes the computer programs stored in the storage unit (13) to function as the correction unit (14a), the determination unit (14b), and the control unit (14c).

The control device (14) is electrically connected to a blowing unit (20) to control operation of the blowing unit (20). The blowing unit (20) circulates air in a space (room) where the filter (30) is installed. Air blown out of the blowing unit (20) passes through the filter (30) and circulates in the room. The blowing unit (20) and the filter (30) are included in an air purification device (2) configured to purify air in the room, for example.

The correction data (X) is now be described below with reference to FIGS. 1 and 2. FIG. 2 illustrates first correlation information (X1), which is an example of the correction data (X).

Figure 2:
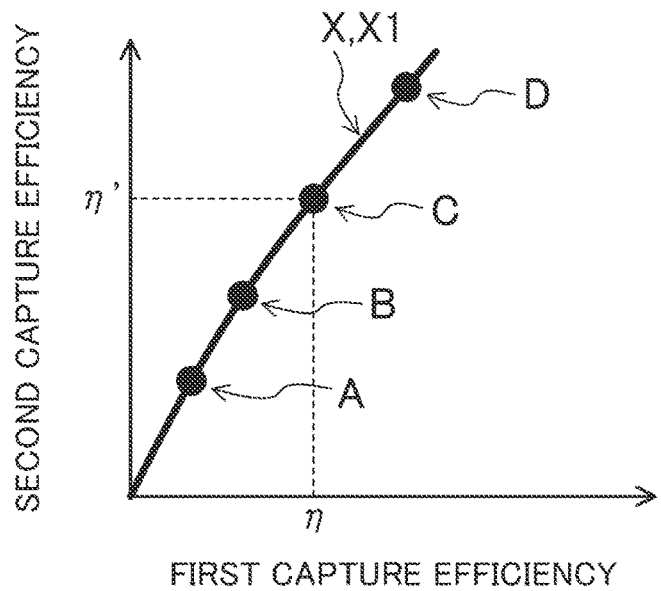
FIG. 2 illustrates first correlation information, which is example correction data.

As illustrated in FIGS. 1 and 2, the first correlation information (X1) indicates a correlation between the first capture efficiency of the filter (30) for the first microscopic particles and the second capture efficiency of the filter (30) for the second microscopic particles.

For example, the first correlation information (X1) is created by performing a test of measuring the first capture efficiency of the filter (30) for the first microscopic particles in the actual environment and a test of measuring the second capture efficiency of the same filter (30) for the second microscopic particles under the conditions of the ASHRAE standard 52.2, and performing an association process of associating the measured first capture efficiency and the measured second capture efficiency with each other. The association process is performed multiple times by using the multiple types of filters (30) each having different first capture efficiency. This creates, as illustrated in FIG. 2, multiple coordinates A, B, C, D, . . . where the first capture efficiency and the second capture efficiency are associated with each other in a coordinate system where the vertical axis indicates the second capture efficiency and the horizontal axis indicates the first capture efficiency. Then, an approximate expression determined from the coordinates A, B, C, D, . . . is output and set as first correlation information (X1).

The correction unit (14a) corrects the first capture efficiency acquired by the acquisition unit (11) to the second capture efficiency on the basis of the first correlation information (X1). For example, as illustrated in FIG. 2, when the first capture efficiency η is acquired by the acquisition unit (11), the correction unit (14a) outputs the second capture efficiency 11 associated with the first capture efficiency η in the first correlation information (X1), as a value where the first capture efficiency η is corrected to the second capture efficiency.

As described above, in the first embodiment, the reference value under the ASHRAE standard 52.2 (e.g., 75% or higher of the capture efficiency according to rating of MERV14) is used as a reference value for use of the filter (30). The correction unit (14a) compares between the reference value under the ASHRAE standard 52.2 and the second capture efficiency η' to determine the deterioration of the performance of the filter (30) (e.g., whether or not the filter (30) satisfies the reference value under the ASHRAE standard 52.2).

With reference to FIG. 3A to FIG. 4B, a description will be made of the reason why the second capture efficiency η' obtained by correcting the first capture efficiency η is used instead of the first capture efficiency η acquired in the actual environment when determination regarding the deterioration of the performance of the filter (30) is made.

Figure 3A:
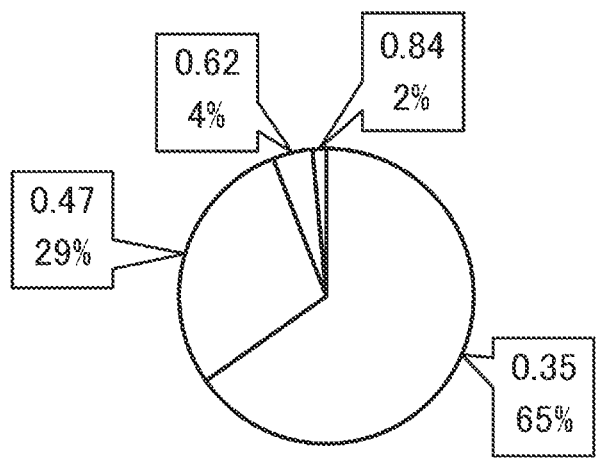
FIG. 3A illustrates a particle size distribution of first microscopic particles (airborne dust particles) present in an actual environment.
Figure 3B:
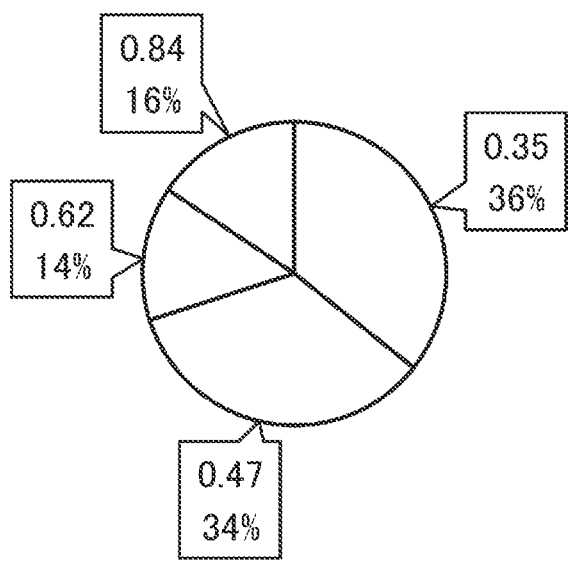
FIG. 3B illustrates a particle size distribution of second microscopic particles used under the ASHRAE standard 52.2.

FIG. 3A illustrates an example particle size distribution of the first microscopic particles (airborne dust particles) present in the actual environment. FIG. 3B illustrates a particle size distribution of the second microscopic particles used in the ASHRAE standard 52.2. As illustrated in FIGS. 3A and 3B, the present inventors examined the particle size distribution of the first microscopic particles (airborne dust particles) present in the actual environment and the particle size distribution of the second microscopic particles (KCl microscopic particles) used in the ASHRAE standard 52.2. The proportion of microscopic particles having a relatively small average particle diameter (0.35 μm and 0.47 μm) in the first microscopic particles is larger than that in the second microscopic particles. Thus, it is estimated that the capture efficiency for the second microscopic particles is higher than that for the first microscopic particles when the same filter (30) is used. In other words, it is estimated that the second capture efficiency η' of the filter (30) under the conditions of the ASHRAE standard 52.2 is higher than the first capture efficiency η of the same filter (30) in the actual environment. Based on the above estimation, the present inventors have found that it is difficult to accurately determine the deterioration of the performance of the filter (30) even if the reference value of the ASHRAE standard 52.2 is compared with the first capture efficiency η acquired in the actual environment.

Figures 4A, 4B:
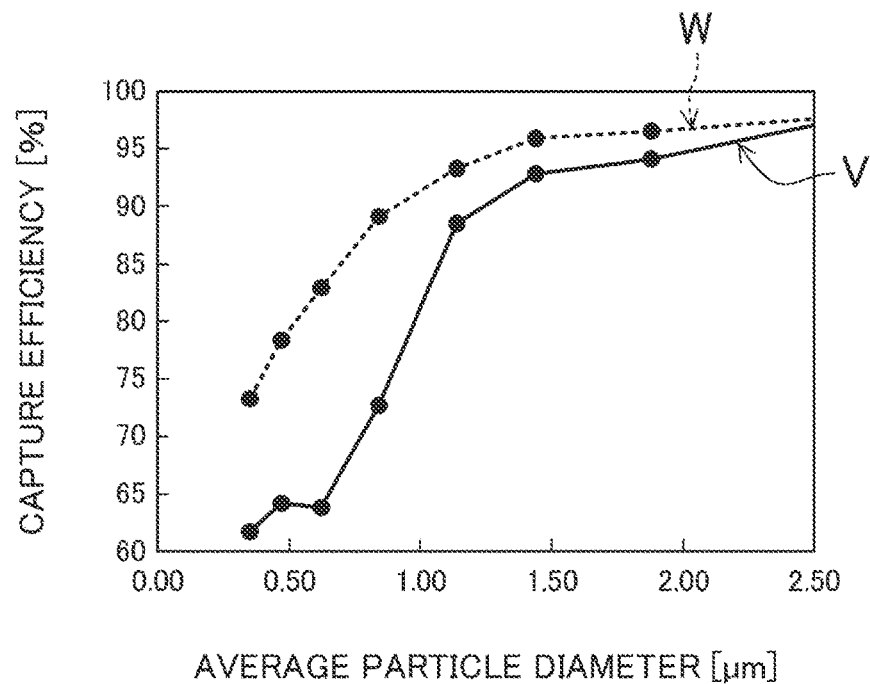
FIG. 4A illustrates a relationship between capture efficiency and an average particle diameter of each of the first microscopic particles and the second microscopic particles.
FIG. 4B illustrates first capture efficiency and second capture efficiency of the same filter.

In FIG. 4A, a graph (V) shows experimental results indicating the first capture efficiency of the first microscopic particles (airborne dust particles) present in the actual environment for each average particle diameter of microscopic particles. A graph (W) shows experimental results indicating the second capture efficiency of the second microscopic particles (KCl microscopic particles) used in the ASHRAE standard 52.2 for each average particle diameter of potassium chloride.

As shown in the graphs (V) and (W), the capture efficiency of the filter (30) for the first microscopic particles and that for the second microscopic particles differ even if they have the same average particle diameter. Specifically, even if the average particle diameter is the same, the second capture efficiency (see the graph (W)) of the second microscopic particles is higher than the first capture efficiency (see the graph (V)) of the first microscopic particles. In other words, even if the average particle diameter is the same, the capture efficiency of the filter (30) varies depending on the type of the microscopic particles captured. Based on the above findings, the present inventors have found that it is difficult to accurately determine the deterioration of the performance of the filter (30) even if the reference value of the ASHRAE standard 52.2 for capturing of KCl microscopic particles is compared with the first capture efficiency η for capturing of the airborne dust particles in the actual environment.

FIG. 4B shows the first capture efficiency of the filter (30) for the first microscopic particles (airborne dust particles) in the actual environment and the second capture efficiency of the same filter (30) for the second microscopic particles (KCl microscopic particles) under the conditions of the ASHRAE standard 52.2. The first capture efficiency and the second capture efficiency each indicate a capture efficiency for microscopic particles having an average particle diameter ranging from 0.3 μm to 1.0 μm. As illustrated in FIG. 3A, even when the same filter (30) is used, the capture efficiency in the actual environment differs from that under the conditions of the ASHRAE standard 52.2. The first capture efficiency is 0.61, whereas the second capture efficiency is 0.79.

This demonstrates that 0.61, which is the first capture efficiency, does not satisfy the capture efficiency of 75% or higher of MERV14, which is an example reference of the ASHRAE standard 52.2, whereas 0.79, which is the second capture efficiency, satisfies the capture efficiency of 75% or higher of MERV14, even through the same filter (30) is used. Thus, the present inventors have found that, when determining whether or not the filter (30) satisfies the reference of the ASHRAE 52.2 standard, even if 0.61, which is the first capture efficiency in the actual environment is used as it is, the determination cannot be accurately made because there is a gap with 0.79, which is the second capture efficiency of the ASHRAE standard 52.2.

Thus, as illustrated in FIG. 2, the present inventors have derived that the first capture efficiency η in the actual environment is corrected to the second capture efficiency η', which is a capture efficiency under the conditions of the ASHRAE standard 52.2, and that the second capture efficiency η' is compared with the reference of the ASHRAE standard 52.2, in order to determine whether or not the filter (30) satisfies the reference of the ASHRAE standard 52.2.

First Example of Operation of Control Device (14)

Figure 5:
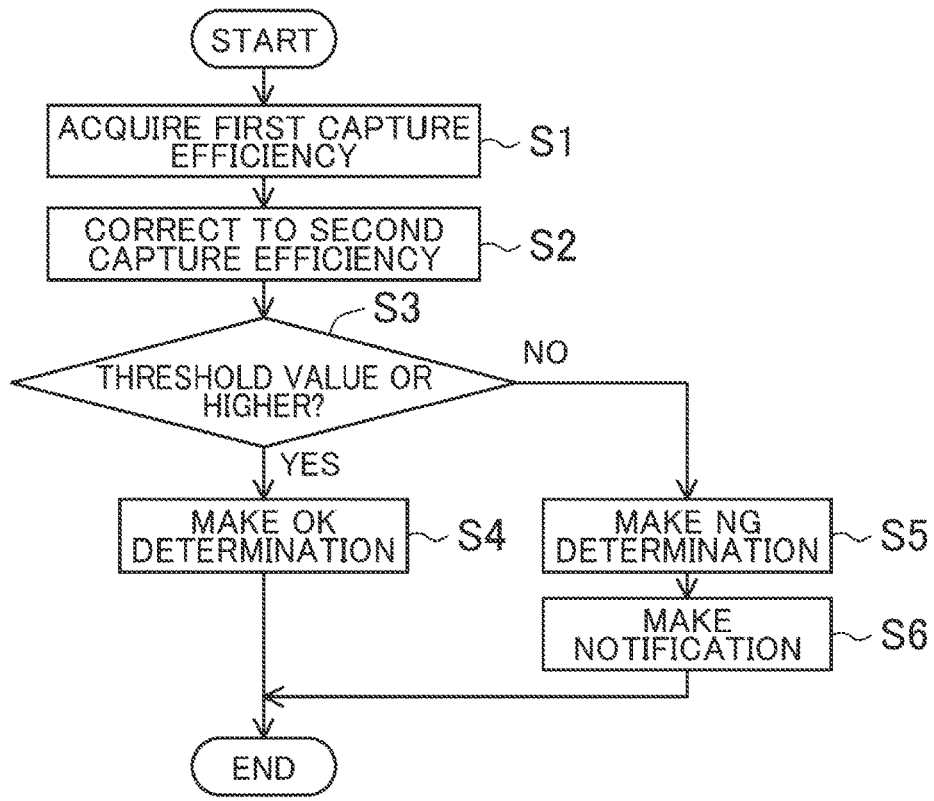
FIG. 5 is flowchart of an example operation of a control device.

With reference to FIGS. 1, 2, and 5, a description will be given of a first example of operation of the control device (14) in determining whether or not the filter (30) satisfies the reference of the ASHRAE standard 52.2. FIG. 5 is flowchart of the example operation of a control device (14).

As illustrated in FIGS. 1 and 5, in Step S1, the acquisition unit (11) acquires information indicating the first capture efficiency η of the filter (30) in the actual environment.

In Step S2, the correction unit (14a) corrects the first capture efficiency η to second capture efficiency η' on the basis of first correlation information (X1) (see FIG. 2). Specifically, the correction unit (14a) outputs the second capture efficiency η' corresponding to the first capture efficiency η in the first correlation information (X1), as a corrected value of the first capture efficiency η.

In Step S3, the determination unit (14b) compares the second capture efficiency η' with the threshold value (Y) stored in the storage unit (13). Then, the determination unit (14b) performs a determination process of determining whether or not the second capture efficiency η' is the threshold value (Y) or higher.

The threshold value (Y) is a value set on the basis of the reference value for the use of the filter (30). In the first embodiment, the reference value for the use of the filter (30) is 75% or higher of the capture efficiency of MERV14, which is an example reference value of the ASHRAE standard 52.2. In the first embodiment, for example, the threshold value (Y) is set to a value larger than 75%, which is the lower limit of the capture efficiency of MERV14, (e.g., the capture efficiency of 80%) or the same value as 75%, which is the lower limit.

If the determination unit (14b) determines that the second capture efficiency η' is the threshold value (Y) or higher (Yes in Step S3), the process goes to Step S4.

If the determination unit (14b) determines that the second capture efficiency η' is not the threshold value (Y) or higher (No in Step S3), the process goes to Step S5.

In Step S4, the determination unit (14b) determines that the filter (30) installed in the actual environment satisfies the reference of ASHRAE standard 52.2 (OK determination). In other words, the determination unit (14b) determines that the filter (30) installed in the actual environment is allowed to be used continuously. When the process shown in Step S4 ends, the first operation ends.

In Step S5, the determination unit (14b) determines that the filter (30) installed in the actual environment does not satisfy the reference of the ASHRAE standard 52.2, or may not satisfy the reference of the ASHRAE standard 52.2 in the near future (NG determination). In other words, the determination unit (14b) determines that the filter (30) installed in the actual environment should be replaced.

In Step S6, the control unit (14c) operates the notification unit (12) to make notification of predetermined information. The predetermined information includes, for example, information indicating that the filter (30) should be replaced. A user, a service person, or the like can recognize the time for replacement of the filter (30) by checking the notification of the predetermined information from the notification unit (12). When the process shown in Step S6 ends, the first operation ends.

Second Example of Operation of Control Device (14)

Figure 6:
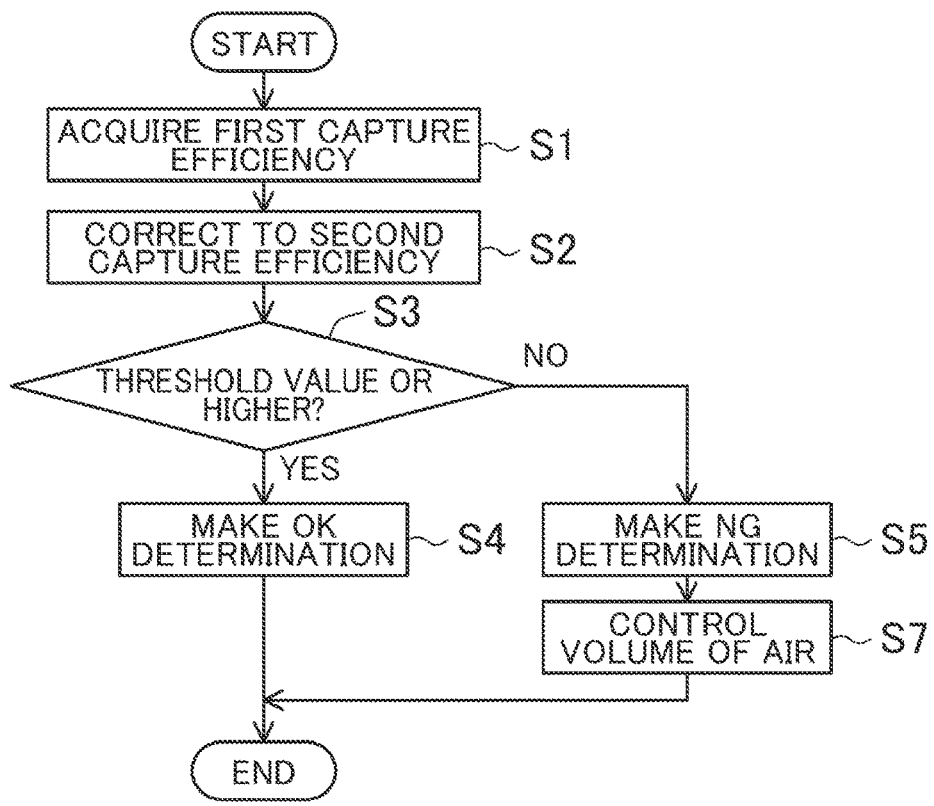
FIG. 6 is flowchart of a second example of operation of the control device.

The second example of the operation of the control device (14) will be described with reference to FIGS. 1, 6, and 7. FIG. 6 is a flowchart of a second example of operation of the control device (14).

The following mainly describes differences of the operation of the control device (14) shown in FIG. 5 from the first example.

As illustrated in FIGS. 1 and 6, the processes shown in Steps S1 to S5 are performed in the same manner as in the first example. When the process shown in Step S5 ends, the process goes to Step S7.

In Step S7, the control unit (14c) controls operation of the blowing unit (20) on the basis of the results of the determination process shown in Step S3. Specifically, if the control unit (14c) determines in Step S3 that the second capture efficiency η' is not the threshold value (Y) or higher, the control unit (14c) sends a command signal to the air purification device (2) to increase the volume of air from the blowing unit (20). Increasing the volume of air from the blowing unit (20) means, for example, increasing the rotational speed of the motor included in the blowing unit (20) to be higher than that at the current time point (the time point at which the determination unit (14b) performs the determination process). When the process shown in Step S7 ends, the second operation ends.

Figure 7:
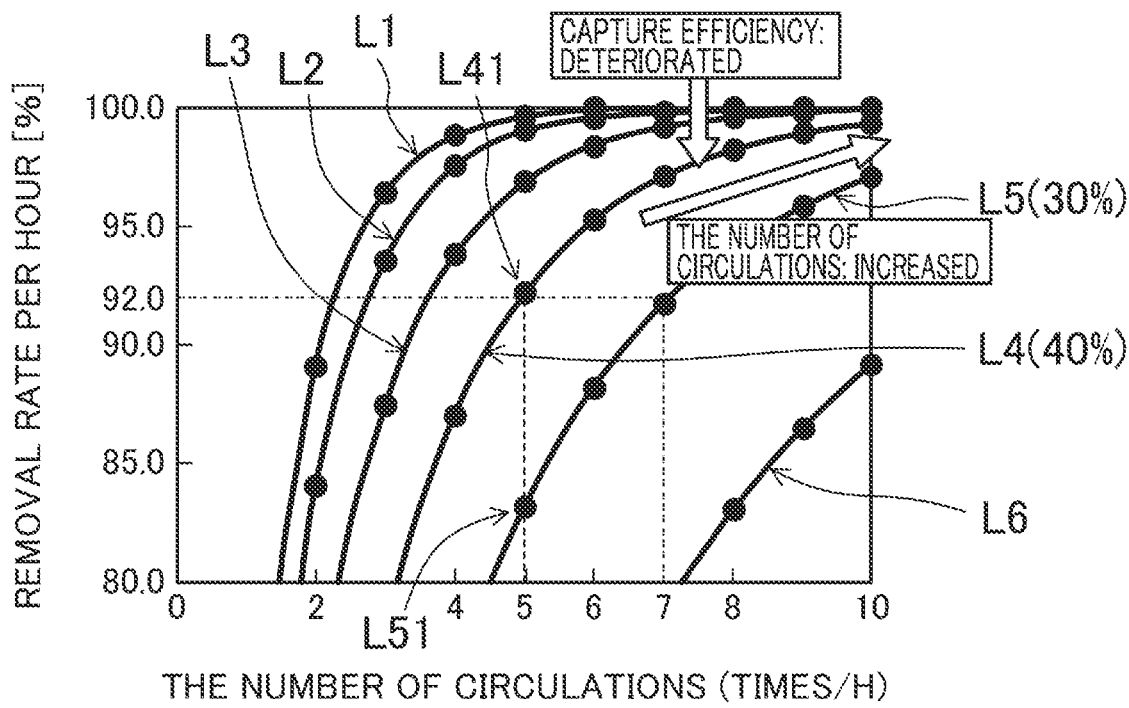
FIG. 7 illustrates a relationship between the number of circulations of inside air per hour and a removal rate for first microscopic particles in the room per hour in a space where the filter is installed.

With reference to FIG. 7, the reason why the control unit (14c) increases the volume of air from the blowing unit (20) in Step S7 will be described. FIG. 7 illustrates a relationship between the number of circulations of inside air per hour and the removal rate for airborne dust particles (first microscopic particles) in the room per hour, in a space (room) where the filter (30) is installed.

FIG. 7 shows lines L1 to L6. The capture efficiency for airborne dust particles of each of the lines L1 to L6 is set to be constant. The capture efficiencies of the lines L1 to L6 decrease in the order of the lines L1 to L6. For example, the capture efficiency of the line L4 is lower than that of the line L5. For example, the capture efficiency of the line L4 is 40%, and the capture efficiency of the line L3 is 30%. In this case, if the number of circulations of air is set to be the same (in other words, the volume of air from the blowing unit (20) is set to be the same), the removal rate of airborne dust particles (the removal rate per hour) is lower for the line L5 than for the line L4 (see coordinates L41 and L51 in FIG. 7). Thus, for example, even if the capture efficiency becomes lower than a desired value (e.g., 40% indicated by the line L4) due to deterioration of the filter (30), the decrease in the removal rate for the airborne dust particles is inhibited by increasing the number of circulations of air through increase in the volume of air from the blowing unit (20). For example, when the state where the capture efficiency is 40% as indicated by the line L4 and the number of circulations of air is five is changed to the state where the capture efficiency decreases to 30% as indicated by the line L5, the volume of air from the blowing unit (20) is increased, and the number of circulations of air is increased to seven, whereby the removal rate of the filter (30) for airborne dust particles is maintained to be identical to that (the removal rate: 92%) of the state where the capture efficiency is 40%.

In Step S7 shown in FIG. 7, the control unit (14c) performs a process of increasing the volume of air from the blowing unit (20) in order to maintain the removal rate of the filter (30) for airborne dust particles to be substantially identical to that when the second capture efficiency η' is the threshold value (Y) or higher even when the second capture efficiency η' is smaller than the threshold value (Y).

In the second example of the operation of the control device (14) shown in FIG. 6, the notification process (see Step S6 in FIG. 5) by the notification unit (12) shown in the first example may be further performed.

Advantages of First Embodiment

As described above with reference to FIGS. 1 to 7, the correction unit (14a) corrects the first capture efficiency η acquired by the acquisition unit (11) to the second capture efficiency η' on the basis of the first correlation information (X1), which is example correction data (X). This allows the first capture efficiency η of the filter (30) in the actual environment to be corrected to the second capture efficiency η' set to a reference value for use of the filter (30) such as the ASHRAE standard. As a result, the determination unit (14b) can accurately determine whether or not the filter (30) used in the actual environment satisfies the threshold value (Y) set based on the reference value of the ASHRAE standard.

Second Embodiment

Figure 8:
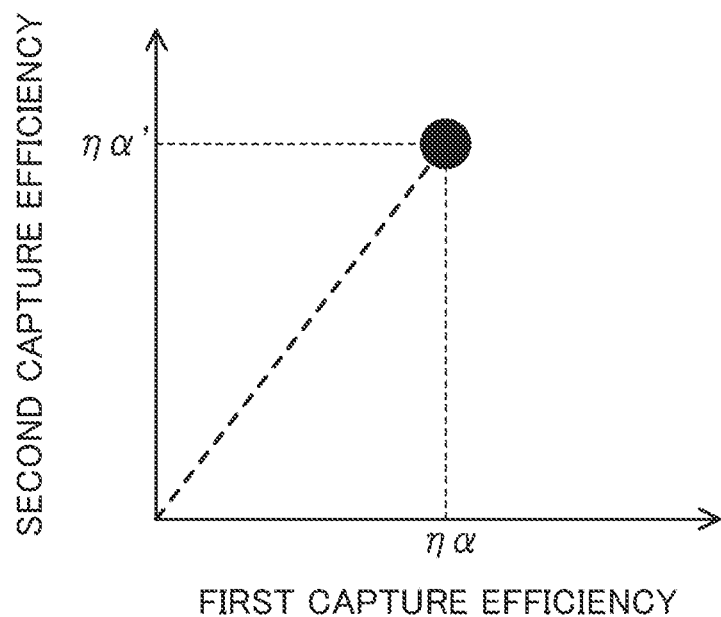
FIG. 8 illustrates a correlation between the first capture efficiency of the filter for the first microscopic particles and the second capture efficiency of the filter for the second microscopic particles.

With reference to FIGS. 1 and 8, a second example of the correction data (X) shown in FIG. 1 will be described.

The second example of the correction data (X) indicates the ratio Z (correlation information) of the second capture efficiency to the capture efficiency of the filter (30) for the test microscopic particles. The test microscopic particles indicate the first microscopic particles estimated to be present in the actual environment or the first microscopic particles measured in the actual environment. In the second embodiment, the test microscopic particles are airborne dust particles.

With reference to FIG. 8, the ratio Z, which is the second example of the correction data (X), will be described. FIG. 8 illustrates a correlation between the first capture efficiency of the filter (30) for the first microscopic particles and the second capture efficiency of the filter (30) for the second microscopic particles.

FIG. 8 shows the first capture efficiency $\eta\alpha$ and the second capture efficiency $\eta\alpha'$. The first capture efficiency $\eta\alpha$ indicates the capture efficiency of the filter (30) in the actual environment. The second capture efficiency $\eta\alpha'$ indicates the capture efficiency of the filter (30) where the capture efficiency in the actual environment becomes the first capture efficiency $\eta\alpha$, measured under the conditions of the ASHRAE standard 52.2. The ratio Z is calculated using the following equation 1.

$$Z = \eta\alpha'/\eta\alpha \quad \text{Math 1}$$

A specific example of the procedure of calculating the second capture efficiency using the ratio Z will be described.

In Step S1 shown in FIGS. 5 and 6, the acquisition unit (11) acquires information indicating the first capture efficiency $\eta$ of the filter (30) in the actual environment. In Step S2, the correction unit (14a) calculates, as the second capture efficiency $\eta'$, the product of the first capture efficiency $\eta$ and the ratio Z (the second capture efficiency $\eta'$=the first capture efficiency $\eta$×the ratio Z). Then, processes in Step S3 and subsequent steps (see FIGS. 5 and 6) are performed by using the second capture efficiency $\eta'$(=the first capture efficiency $\eta$×the ratio Z).

Advantages of Second Embodiment

As described above with reference to FIGS. 1 and 8, once the ratio Z is calculated, the first capture efficiency $\eta$ can be corrected to the second capture efficiency $\eta'$, so that the first capture efficiency $\eta$ can be easily corrected.

Third Embodiment

With reference to FIGS. 1 and 9 to 12, a third example of the correction data (X) shown in FIG. 1 will be described.

As illustrated in FIGS. 9 to 12, in the third example, the correction data (X) includes second correlation information (X2), correspondence information (X3), first correction information (X31), and first relationship information (X4).

Figure 9:
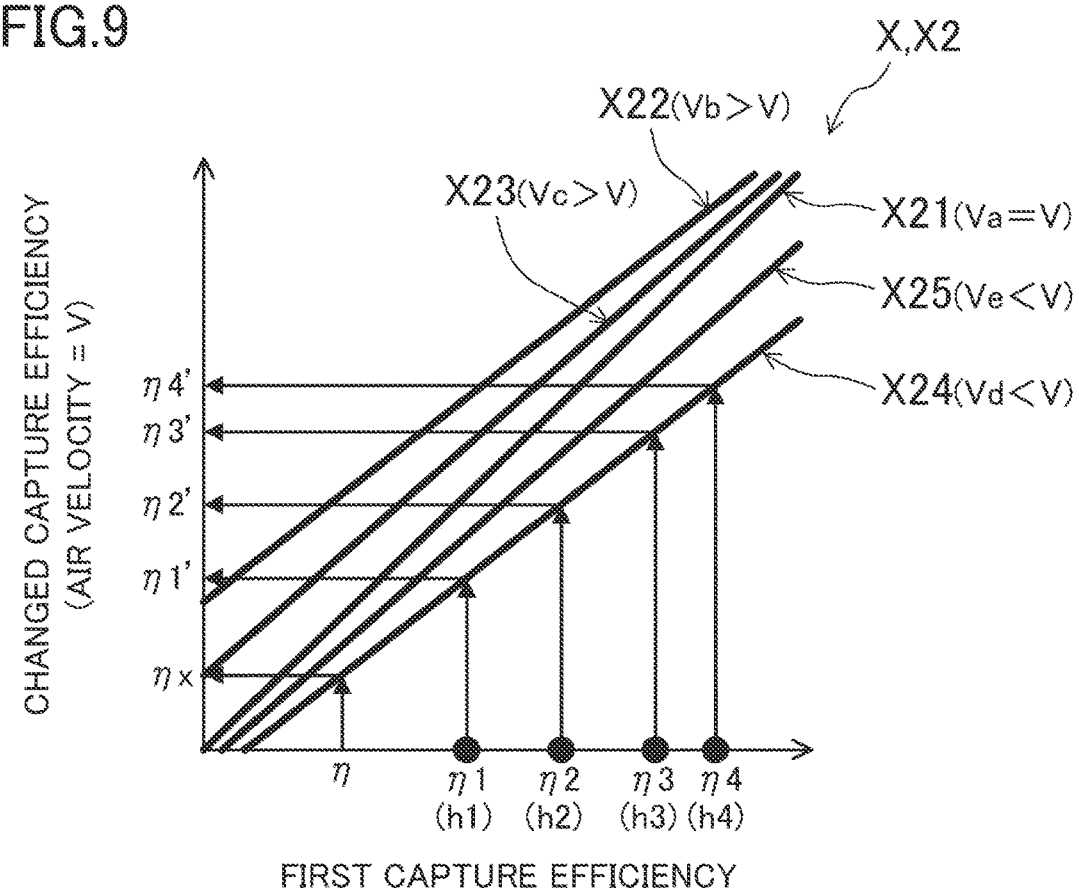
FIG. 9 illustrates second correlation information.

FIG. 9 shows the second correlation information (X2). The second correlation information (X2) indicates a correlation between the first capture efficiency and changed capture efficiency $\eta d'$.

In the third embodiment, the second correlation information (X2) indicates a correlation between first capture efficiency $\eta d$ (d=1, 2, 3, . . . ) of respective constituent microscopic particles of the first microscopic particles and the changed capture efficiency $\eta d'$. The constituent microscopic particles are obtained by classifying multiple types of microscopic particles constituting the first microscopic particles into multiple types based on the average particle diameter. The changed capture efficiency $\eta d'$ is a corrected value of the first capture efficiency $\eta d$ when the air velocity at the time when the first capture efficiency $\eta d$ is acquired is changed to be equal to the air velocity at the time when the second capture efficiency is acquired. The air velocity indicates the velocity of air flowing through the filter (30). The second correlation information (X2) is set by focusing on the gap between the first capture efficiency $\eta d$ and the second capture efficiency caused by the difference between the air velocity in the actual environment (the air velocity at the time when the first capture efficiency $\eta d$ is acquired) and the air velocity under the conditions of the ASHRAE standard 52.2 (the air velocity at the time when the second correlation information (X2) is acquired).

Hereinafter, the air velocity in the actual environment may be referred to as an actual air velocity and the air velocity under the conditions of the ASHRAE standard 52.2 may be referred to as a standard air velocity.

As illustrated in FIG. 9, the second correlation information (X2) includes lines X21 to X24. The line X21 indicates a correlation between the first capture efficiency $\eta d$ and the changed capture efficiency $\eta d'$ at the time when the actual air velocity Va is equal to the standard air velocity V. The lines X22 and X23 each indicate a correlation between the first capture efficiency $\eta d$ and the changed capture efficiency $\eta d'$ at the time when the actual air velocity Vb, Vc is higher than the standard air velocity V. The lines X24 and X25 each indicate a correlation between the first capture efficiency $\eta d$ and the changed capture efficiency $\eta d'$ at the time when the actual air velocity Vd, Ve is lower than the standard air velocity V.

Figure 10:
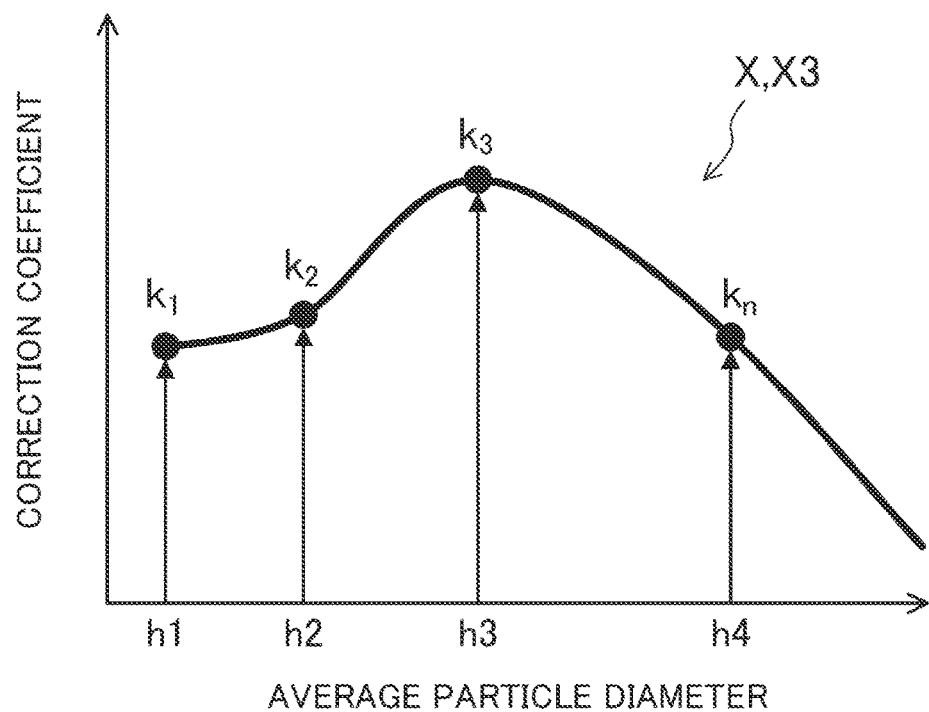
FIG. 10 illustrates a relationship among the first capture efficiency, the changed capture efficiency, and the air velocity.

As illustrated in FIG. 10, the correspondence information (X3) is information in which the average particle diameter hd of the constituent microscopic particles is associated with a predetermined correction coefficient kd. The correction coefficient kd is a coefficient set by focusing on the gap between the first capture efficiency $\eta d$ and the second capture efficiency (see FIG. 4A) caused by the difference in type between the first microscopic particles (airborne dust particles) present in the actual environment and the second microscopic particles (potassium chloride microscopic particles) used in the ASHRAE standard 52.2. The correction coefficient kd is applied to correct the first capture efficiency $\eta d$ to a value used in the ASHRAE standard 52.2 for the second microscopic particles to be captured.

Figures 11, 12, 13:
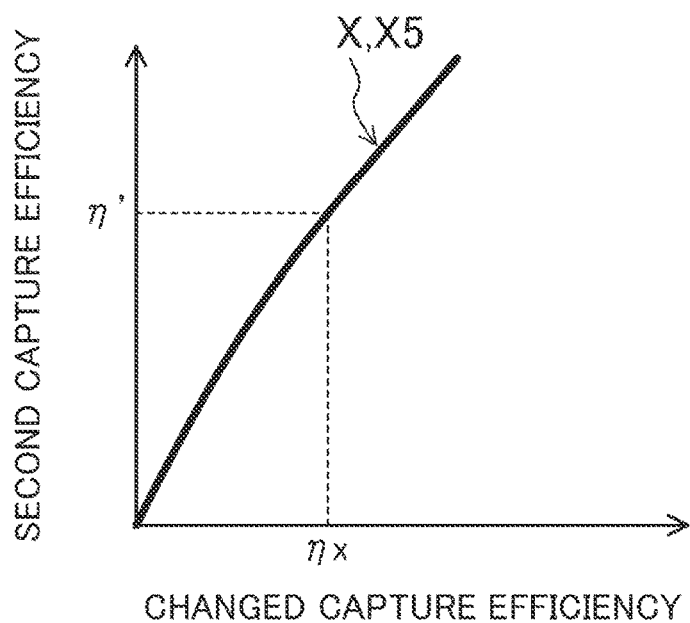
FIG. 11 illustrates first correction information.
FIG. 12 illustrates first relationship information.
FIG. 13 illustrates third correlation information.

As illustrated in FIG. 12, the first relationship information (X4) is a mathematical expression indicating a relationship between the second capture efficiency $\eta'$ and the first revised capture efficiency $\eta d''$ for each type of the constituent microscopic particles.

A specific example of the procedure of calculating the second capture efficiency $\eta'$ using the second correlation information (X2), the correspondence information (X3), and the first relationship information (X4) will be described.

In Step S1 shown in FIGS. 5 and 6, the acquisition unit (11) acquires information indicating the first capture efficiency of the filter (30) in the actual environment. As illustrated in FIG. 9, at this time, the acquisition unit (11) acquires the first capture efficiency $\eta d$ for each type of constituent microscopic particles (for each particle size distribution) of the first microscopic particles. In the third embodiment, the acquisition unit (11) acquires first capture efficiency $\eta 1$ for constituent microscopic particles having an average particle diameter h1, first capture efficiency $\eta 2$ for constituent microscopic particles having an average particle diameter h2, first capture efficiency $\eta 3$ for constituent microscopic particles having an average particle diameter h3, and first capture efficiency η4 for constituent microscopic particles having an average particle diameter h4.

In Step S1, the acquisition unit (11) further acquires information indicating the actual air velocity. In this case, the correcting system (1) includes a velometer (not shown) for measuring the actual air velocity. The velometer is communicatively connected to the acquisition unit (11). In the third embodiment, the velometer measures the actual air velocity Vd, and the acquisition unit (11) acquires information indicating the actual air velocity Vd.

In Step S2, the first capture efficiency ηd is corrected to the second capture efficiency η' on the basis of the information (air velocity information) indicating the actual air velocity Vd acquired by the acquisition unit (11) and the correction data (X) (the second correlation information (X2), the correspondence information (X3), the first correction information (X31), and the first relationship information (X4)). The correction will be described in detail below.

Upon checking the actual air velocity Vd acquired by the acquisition unit (11), the correction unit (14a) selects a line X24 corresponding to the actual air velocity Vd in the second correlation information (X2) shown in FIG. 9. The correction unit (14a) outputs the changed capture efficiency ηd' corresponding to the first capture efficiency ηd in the line X24. The changed capture efficiency ηd' is obtained by changing the first capture efficiency ηd to a value obtained at the time when air flows through the filter (30) at a standard air velocity, in consideration of the difference between the actual air velocity Vd and the standard air velocity of ASHRAE standard 52.2. In the third embodiment, the correction unit (14a) outputs the changed capture efficiency η1' corresponding to the first capture efficiency η1, the changed capture efficiency η2' corresponding to the first capture efficiency η2, the changed capture efficiency η3' corresponding to the first capture efficiency η3, and the changed capture efficiency η4' corresponding to the first capture efficiency η4, in the line X24.

The correction unit (14a) outputs correction coefficient kd (d=1, 2, 3, . . . ) for each type of constituent microscopic particles on the basis of the correspondence information (X3) shown in FIG. 10. In the third embodiment, the correction unit (14a) outputs a correction coefficient k1 for constituent microscopic particles having an average particle diameter h1, a correction coefficient k2 for constituent microscopic particles having an average particle diameter h2, a correction coefficient k3 for constituent microscopic particles having an average particle diameter h3, and a correction coefficient k4 for constituent microscopic particles having an average particle diameter h4.

FIG. 11 illustrates first correction information (X31). In the first correction information (X31), the product of the correction coefficient kd shown in FIG. 10 and the changed capture efficiency ηd' shown in FIG. 9 is output as the first revised capture efficiency ηd". The first revised capture efficiency ηd" is obtained by revising the changed capture efficiency ηd' to a value obtained at the time when microscopic particles (potassium chloride microscopic particles) of ASHRAE standard 52.2 are captured by the filter (30) in consideration of the difference between the type of microscopic particles in the actual environment and the type of microscopic particles of ASHRAE standard 52.2. The correction unit (14a) outputs the first revised capture efficiency ηd" for each type of constituent microscopic particles on the basis of the first correction information (X31). In the third embodiment, the first revised capture efficiencies η1"(=k1×η1'), η2"(=k2×η2'), η3"(=k3×η3'), and η4"(=k4×η4') are output.

The correction unit (14a) substitutes the first revised capture efficiency ηd" into the first relationship information (X4) shown in FIG. 12. In the third embodiment, in the first relationship information (X4), d is a value in the range of 1 to 4 (d=1, 2, 3, 4), n is 4 (n=4), and the first revised capture efficiencies η1" to η4" are substituted. As a result, the second capture efficiency η is output. Then, processes in Step S3 and subsequent steps (see FIGS. 5 and 6) are performed by using the second capture efficiency η' calculated by using the first relationship information (X4) shown in FIG. 12.

Advantages of Third Embodiment

In the third embodiment, the second correlation information (X2) shown in FIG. 9 and the correction coefficient kd in the correspondence information (X3) shown in FIG. 10 are applied to the first capture efficiency ηd. As a result, the first capture efficiency ηd is corrected to the first revised capture efficiency ηd" (see FIG. 12). The first revised capture efficiency ηd" is a value that takes into account the difference between the air velocity in the actual environment and the air velocity of the ASHRAE standard 52.2 and the difference in type of the microscopic particles. Further, the second capture efficiency η' is output by using the first revised capture efficiency ηd" for each type of constituent microscopic particles and the first relationship information (X4). Therefore, the second capture efficiency η' output by using the first relationship information (X4) shown in FIG. 12 takes into account the difference between the air velocity in the actual environment and the air velocity of the ASHRAE standard 52.2, the difference in type of the microscopic particles, and the particle size distribution of the constituent microscopic particles of the first microscopic particles. Accordingly, the second capture efficiency η' can be output accurately.

Fourth Embodiment

With reference to FIGS. 1, 9, and 13, a fourth example of the correction data (X) shown in FIG. 1 will be described.

As illustrated in FIGS. 9 and 13, in the fourth example, the correction data (X) includes second correlation information (X2) and third correlation information (X5).

As illustrated in FIG. 13, the third correlation information (X5) shows a correlation between the changed capture efficiency and the second capture efficiency. The third correlation information (X5) is created by, for example, comparing the results of a test in which the first capture efficiency of the filter (30) for the first microscopic particles is measured in the actual environment and the results of a test in which the second capture efficiency of the same filter (30) for the second microscopic particles is measured under the conditions of the ASHRAE standard 52.2, in the state where the actual air velocity is set to the standard air velocity of the ASHRAE standard 52.2.

A specific example of the procedure of calculating the second capture efficiency using the second correlation information (X2) and the third correlation information (X5) will be described.

In Step S1 shown in FIGS. 5 and 6, the acquisition unit (11) acquires information indicating the first capture efficiency η of the filter (30) in the actual environment. In Step S1, the acquisition unit (11) further acquires information indicating the actual air velocity Vd.

In Step S2, the correction unit (14a) selects a line X24 corresponding to the actual air velocity Vd in the second correlation information (X2) shown in FIG. 9. The correction unit (14a) outputs changed capture efficiency ηx corresponding to the first capture efficiency η in the line X24 acquired by the acquisition unit (11).

The correction unit (14a) outputs the second capture efficiency η1' corresponding to the changed capture efficiency ηx in the third correlation information (X5) shown in FIG. 13. Then, processes in Step S3 and subsequent steps (see FIGS. 5 and 6) are performed by using the second capture efficiency η1'.

Advantages of Fourth Embodiment

In a fourth example, the second capture efficiency η1' to be output by using the second correlation information (X2) and the third correlation information (X5) takes into account the difference between the actual air velocity and the air velocity of the ASHRAE standard 52.2. Thus, the accuracy of the second capture efficiency η1' can be improved.

Fifth Embodiment

With reference to FIGS. 1, 2, 11, 14, and 15, a fifth example of the correction data (X) shown in FIG. 1 will be described.

As illustrated in FIGS. 2, 11, 14, and 15, in the fifth example, the correction data (X) includes correspondence information (X3), second correction information (X32), and second relationship information (X6).

As illustrated in FIG. 15, the second relationship information (X6) is a mathematical expression indicating a relationship between the second capture efficiency η' and the first capture efficiency ηd (d=1, 2, 3, . . . ) of each type of the constituent microscopic particles.

A specific example of the procedure of calculating the second capture efficiency using the correspondence information (X3), the second correction information (X32), and the second relationship information (X6) will be described.

In Step S1, the acquisition unit (11) acquires the first capture efficiency ηd for each type of constituent microscopic particles (for each particle size distribution) of the first microscopic particles, as in the third example. In the fifth embodiment, the acquisition unit (11) acquires first capture efficiency η1 for constituent microscopic particles having an average particle diameter h1, first capture efficiency η2 for constituent microscopic particles having an average particle diameter h2, first capture efficiency η3 for constituent microscopic particles having an average particle diameter h3, and first capture efficiency η4 for constituent microscopic particles having an average particle diameter h4.

In Step S2, the correction unit (14a) outputs correction coefficients k1 to k4 for each type of constituent microscopic particles on the basis of the correspondence information (X3) (see FIG. 10). The correction unit (14a) outputs second revised capture efficiencies ηd''' on the basis of the second correction information (X32) (see FIG. 14). Each of the second revised capture efficiencies ηd''' is the product of the correction coefficient kd (k1 to k4) shown in FIG. 10 and the first capture efficiency ηd (η1 to η4). The second revised capture efficiency ηd''' is obtained by revising the first capture efficiency ηd to a value obtained at the time when microscopic particles of ASHRAE standard 52.2 are captured by the filter (30) in consideration of the difference between the type of microscopic particles in the actual environment and the type of microscopic particles of ASHRAE standard 52.2. In the fifth embodiment, the second revised capture efficiencies η1''' to η4''' are output. The correction unit (14a) substitutes the second revised capture efficiency ηd''' (η1''' to η4''') into the second relationship information (X6) shown in FIG. 15 to output second capture efficiency η'. Then, processes in Step S3 and subsequent steps (see FIGS. 5 and 6) are performed by using the second capture efficiency η'.

Advantages of Fifth Embodiment

The second capture efficiency output by using the second relationship information (X6) shown in FIG. 15 takes into account the difference between the type of microscopic particles in the actual environment and the type of the microscopic particles of the ASHRAE standard 52.2 and the particle size distribution of the constituent microscopic particles of the first microscopic particles. Thus, the accuracy of the second capture efficiency η' can be improved.

While the embodiments and the variations thereof have been described above, it will be understood that various changes in form and details may be made without departing from the spirit and scope of the claims (e.g., (1) below). The embodiments and the variations thereof may be combined and replaced with each other without deteriorating intended functions of the present disclosure.

(1) In the correcting system (1) in the first to fifth embodiments, a first correction process is performed in which the capture efficiency of the filter (30) for the first microscopic particles in the actual environment is corrected to the capture efficiency for the second microscopic particles defined in the standard where reference values (the capture efficiencies as references) are set for the use of the filter (30). However, the present invention is not limited to this. The correcting system (1) may perform a second correction process. In the second correction process, a calculation process is performed in the reverse order of the first correction process.

In the second correction process, the first microscopic particles correspond to second microscopic particles in the first correction process, which are microscopic particles of the predetermined standard (microscopic particles defined by the standard in which the reference value for the use of the filter (30) is set). The microscopic particles of the predetermined standard are, for example, microscopic particles used in the ASHRAE standard 52.2. In the second correction process, the second microscopic particles correspond to first microscopic particles of the first correction process, which are microscopic particles captured by the filter (30) in the actual environment. That is, the capture efficiency (the second capture efficiency) for the second microscopic particles in the second correction process has the same meaning as the capture efficiency (the first capture efficiency) for the first microscopic particles in the first correction process, and the capture efficiency (the first capture efficiency) for the first microscopic particles in the second correction process has the same meaning as the capture efficiency (the second capture efficiency) for the second microscopic particles in the first correction process. In the second correction process, the control device (14) of the correcting system (1) corrects the capture efficiency for the first microscopic particles of a predetermined standard to the capture efficiency for the second microscopic particles captured in the actual environment by the calculation process in the reverse order of the first correction process.

As can be seen from the foregoing description, the present disclosure is useful for a correcting system and a correcting method.

The invention claimed is:

1. A correcting system comprising:
an acquisition unit configured to acquire information indicating a first capture efficiency of a filter for first microscopic particles in an atmosphere around the filter in a usage environment where the filter is installed;
a control device including a processor;
a blowing unit electrically connected to the control device and configured to blow air to the filter in accordance with a command signal received from the control device; and
a storage unit configured to store correction data for correcting the first capture efficiency to a second capture efficiency of the filter for second microscopic particles, the second microscopic particles being microscopic particles defined in a standard that sets reference values for use of the filter,
the control device being configured to
correct the first capture efficiency acquired by the acquisition unit to the second capture efficiency based on the correction data,
perform a determination process to determine whether or not the second capture efficiency obtained by correcting the first capture efficiency is smaller than a predetermined threshold value, and
control the blowing unit based on a result of the determination process such that the blowing unit increases a volume of the air blown to the filter upon determining that the second capture efficiency is smaller than the predetermined threshold value.

2. The correcting system of claim 1, wherein
the correction data includes first correlation information indicating a correlation between the first capture efficiency and the second capture efficiency.

3. The correcting system of claim 1, wherein
the correction data includes correlation information indicating a correlation of the second capture efficiency with capture efficiency of the filter for test microscopic particles, and
the test microscopic particles indicate
first microscopic particles estimated to be present in an actual environment or
the first microscopic particles measured in the actual environment.

4. The correcting system of claim 1, wherein
the correction data includes correlation information indicating a correlation of the second capture efficiency with capture efficiency of the filter for test microscopic particles, and
the test microscopic particles indicate the first microscopic particles of a predetermined standard.

5. The correcting system of claim 1, wherein
the acquisition unit is further configured to acquire air velocity information indicating an air velocity of air flowing through the filter,
the first microscopic particles include constituent microscopic particles of multiple types having different average particle diameters, and
the correction data includes
second correlation information indicating a correlation between the first capture efficiency and a changed capture efficiency, which is a corrected value of the first capture efficiency when an air velocity at the time of acquisition of the first capture efficiency is changed to be identical to an air velocity at the time of acquisition of the second capture efficiency, correspondence information in which an average particle diameter of the constituent microscopic particles is associated with a predetermined correction coefficient, and
first relationship information indicating a relationship between the second capture efficiency and first revised capture efficiency output based on the changed capture efficiency and the correction coefficient for each of the multiple types of constituent microscopic particles, and
the correction unit is configured to correct the first capture efficiency to the second capture efficiency further based on the air velocity information acquired by the acquisition unit.

6. The correcting system of claim 1, wherein
the acquisition unit is further configured to acquire air velocity information indicating an air velocity of air flowing through the filter,
the correction data includes
second correlation information indicating a correlation between the first capture efficiency and a changed capture efficiency, which is a corrected value of the first capture efficiency when an air velocity at the time of acquisition of the first capture efficiency is changed to be identical to an air velocity at the time of acquisition of the second capture efficiency, and
third correlation information indicating a correlation between the changed capture efficiency and the second capture efficiency, and
the correction unit is configured to correct the first capture efficiency to the second capture efficiency further based on the air velocity information acquired by the acquisition unit.

7. The correcting system of claim 1, wherein
the first microscopic particles include constituent microscopic particles of multiple types having different average particle diameters, and
the correction data includes
correspondence information in which an average particle diameter of the constituent microscopic particles is associated with a predetermined correction coefficient, and
second relationship information indicating a relationship between the second capture efficiency and second revised capture efficiency output based on the first capture efficiency and the correction coefficient for each type of the constituent microscopic particles.

8. The correcting system of claim 1, wherein
the control device is configured to control the blowing unit to increase the volume of the air blown to the filter by increasing a rotational speed of a motor of the blowing unit.

9. A correcting method comprising using a control device including a processor and a storage to perform:
acquiring information indicating a first capture efficiency of a filter for first microscopic particles in an atmosphere around the filter in a usage environment where the filter is installed;
correcting the first capture efficiency to a second capture efficiency of the filter for second microscopic particles, the correcting being based on correction data stored in the storage, the second microscopic particles being microscopic particles defined in a standard that sets reference values for use of the filter;
performing a determination process to determine whether or not the second capture efficiency obtained by correcting the first capture efficiency is smaller than a predetermined threshold value;

based on a result of the determination process, controlling a blowing unit arranged and configured to blow air to the filter such that the blowing unit increases a volume of the air blown to the filter upon determining that the second capture efficiency is smaller than the predetermined threshold value.

10. The correcting method of claim 9, wherein
the controlling the blowing unit to increase the volume of the air blown to the filter includes increasing a rotational speed of a motor of the blowing unit.

\* \* \* \* \*